US012062851B2

(12) United States Patent
Oh et al.

(10) Patent No.: US 12,062,851 B2
(45) Date of Patent: Aug. 13, 2024

(54) ANTENNA DEVICE AND DISPLAY DEVICE INCLUDING THE SAME

(71) Applicant: DONGWOO FINE-CHEM CO., LTD., Jeollabuk-do (KR)

(72) Inventors: Yun Seok Oh, Gyeonggi-do (KR); Dong Pil Park, Incheon (KR); Seung Hyun Shin, Seoul (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 227 days.

(21) Appl. No.: 17/690,292

(22) Filed: Mar. 9, 2022

(65) Prior Publication Data

US 2022/0200157 A1 Jun. 23, 2022

Related U.S. Application Data

(63) Continuation of application No. PCT/KR2020/012212, filed on Sep. 10, 2020.

(30) Foreign Application Priority Data

Sep. 11, 2019 (KR) ........................ 10-2019-0112961

(51) Int. Cl.
*H01Q 1/24* (2006.01)
*H01Q 1/42* (2006.01)
*H01Q 7/00* (2006.01)
*H01Q 15/14* (2006.01)

(52) U.S. Cl.
CPC ............. *H01Q 15/14* (2013.01); *H01Q 1/243* (2013.01); *H01Q 1/422* (2013.01); *H01Q 7/00* (2013.01)

(58) Field of Classification Search
CPC ........... H01Q 1/24; H01Q 1/243; H01Q 1/38; H01Q 1/422; H01Q 1/44; H01Q 1/48; H01Q 7/00; H01Q 15/14; H01Q 21/08
See application file for complete search history.

(56) References Cited

U.S. PATENT DOCUMENTS

2018/0366818 A1* 12/2018 Kawaguchi .......... H01Q 19/005
2020/0251814 A1* 8/2020 Ryu ......................... H01Q 7/00
2022/0029280 A1* 1/2022 Huh ....................... H01Q 1/364
(Continued)

FOREIGN PATENT DOCUMENTS

CN 108604736 A 9/2018
JP 2012-120001 A 6/2012
JP 2012120001 A * 6/2012
(Continued)

OTHER PUBLICATIONS

International Search Report for PCT/KR2020/012212 mailed on Dec. 24, 2020.

*Primary Examiner* — Thai Pham
(74) *Attorney, Agent, or Firm* — The PL Law Group, PLLC

(57) ABSTRACT

An antenna device according to embodiments of the present invention includes a dielectric layer, an antenna unit disposed on a top surface of the dielectric layer, the antenna unit including a radiator and a transmission line connected to the radiator, and a reflective pattern electrically and physically separated from the antenna unit and disposed on the top surface of the dielectric layer together with the antenna unit. A frequency or signal transfer between different communication devices can be implemented through the reflective pattern.

15 Claims, 5 Drawing Sheets

(56) References Cited

U.S. PATENT DOCUMENTS

2022/0037765 A1* 2/2022 Lee .......................... H01Q 1/36

FOREIGN PATENT DOCUMENTS

| | | | |
|---|---|---|---|
| KR | 10-2010-0059076 | A | 6/2010 |
| KR | 10-2013-0095451 | A | 8/2013 |
| KR | 10-2016-0080444 | A | 7/2016 |
| KR | 10-2017-0004634 | A | 1/2017 |
| KR | 10-2015530 | B1 | 8/2019 |
| WO | WO 02/15333 | A1 | 2/2002 |
| WO | WO 2019/143190 | A1 | 7/2019 |

* cited by examiner

ANTENNA DEVICE AND DISPLAY DEVICE INCLUDING THE SAME

CROSS-REFERENCE TO RELATED APPLICATION

The present application is a continuation application to International Application No. PCT/KR2020/012212 with an International Filing Date of Sep. 10, 2020, which claims the benefit of Korean Patent Application No. 10-2019-0112961 filed on Sep. 11, 2019 at the Korean Intellectual Property Office, the disclosures of which are incorporated by reference herein in their entirety.

BACKGROUND

1. Technical Field

The present invention relates to an antenna device and a display device including the same. More particularly, the present invention relates to an antenna device including an electrode pattern, and a display device including the same.

2. Background Art

As information technologies have been developed, a wireless communication technology such as Wi-Fi, Bluetooth, etc., is combined with a display device in, e.g., a smartphone form. In this case, an antenna may be combined with the display device to provide a communication function.

As mobile communication technologies have been rapidly developed, an antenna capable of operating a high frequency or ultra-high frequency communication is needed in the display device. Further, as thin, high-transparency and high-resolution display devices such as a transparent display and a flexible display are recently developed, the antenna is also developed in the form of, e.g., a film or a patch including a thin film electrode.

However, as a frequency band of the antenna increases, a diffraction property may become weakened, and thus a coverage of the antenna may be decreased and an antenna gain may be also decreased due to interference or noises from an external environment wave.

Additionally, as a space of the display device in which the antenna is included decreases, an antenna electrode having sufficient gain property, directivity and coverage may not be easily designed.

For example, Korean Published Patent Application No. 2013-0095451 discloses an antenna integrated into a display panel, but does not sufficiently consider the above-described antenna electrode design corresponding to a high frequency.

SUMMARY

According to an aspect of the present invention, there is provided an antenna device having improved radiation efficiency and reliability.

According to an aspect of the present invention, there is provided a display device including an antenna device with radiation efficiency and reliability.

(1) An antenna device, including: a dielectric layer; an antenna unit disposed on a top surface of the dielectric layer, the antenna unit including a radiator and a transmission line connected to the radiator; and a reflective pattern electrically and physically separated from the antenna unit and disposed on the top surface of the dielectric layer together with the antenna unit.

(2) The antenna device of the above (1), wherein the antenna unit and the reflective pattern each includes a mesh structure.

(3) The antenna device of the above (2), further including a dummy pattern having a mesh shape, wherein the dummy pattern is disposed around the antenna unit and the reflective pattern to be electrically and physically separated from the antenna unit and the reflective pattern.

(4) The antenna device of the above (1), wherein a plurality of the reflective patterns are arranged in a horizontal direction.

(5) The antenna device of the above (4), wherein the plurality of the reflective patterns are arranged so that areas of the reflective patterns sequentially increase or decrease along the horizontal direction.

(6) The antenna device of the above (4), wherein a plurality of the reflective patterns are arranged in the horizontal direction to define a reflective pattern row, and a plurality of the reflective pattern rows are arranged along a vertical direction.

(7) The antenna device of the above (6), wherein the reflective patterns included in the reflective pattern rows neighboring each other are arranged to face each other in an opposite arrangement form or in an opposite arrangement order.

(8) The antenna device of the above (1), wherein the reflective patterns having different areas are disposed to sequentially overlap in a planar view.

(9) The antenna device of the above (1), wherein the antenna unit further includes a signal pad connected to an end portion of the transmission line.

(10) The antenna device of the above (9), wherein the reflective pattern and the signal pad are disposed at opposite sides with the radiator interposed therebetween.

(11) The antenna device of the above (1), further including a ground layer disposed on a bottom surface of the dielectric layer.

(12) The antenna device of the above (1), wherein a spacing distance between the radiator and the reflective pattern is equal to or greater than half a wavelength (212) of a resonance frequency of the radiator.

(13) The antenna device of the above (1), wherein the radiator and the reflective pattern include at least one selected from the group consisting of silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), molybdenum (Mo), calcium (Ca) and an alloy containing at least one therefrom.

(14) A display device including the antenna device according to embodiments as described above.

(15) The display device of the above (14), wherein the antenna device is disposed at a front side of the display device, and the radiator and the reflective pattern have a mesh structure.

(16) The display device of the above (14), wherein the antenna device is disposed at a rear side of the display device, and the radiator and the reflective pattern have a shape of a solid conductive pattern separated from each other.

An antenna device according to embodiments of the present invention may include an antenna unit and a reflective pattern electrically and physically spaced apart from the antenna unit. For example, a frequency or a signal may be supplied from a reflective pattern included in another mobile device on which the antenna device is included, thereby reducing a signal loss occurring during a high-frequency driving and increasing a gain amount.

In exemplary embodiments, s plurality of reflective patterns may be disposed in an array form, and may be designed to cancel interference due to a phase difference between neighboring reflective patterns.

DETAILED DESCRIPTION OF THE EMBODIMENTS

According to exemplary embodiments of the present invention, there is provided an antenna device that includes a radiator and a reflective pattern to have improved radiation efficiency and reliability.

The antenna device may be, e.g., a microstrip patch antenna fabricated in the form of a transparent film. The antenna device may be applied to communication devices for a mobile communication of a high or ultrahigh frequency band (e.g., 3G, 4G, 5G or more).

According to exemplary embodiments of the present invention, there is also provided a display device including the antenna device. However, an application of the antenna device is not limited to a display device, and the antenna device may be applied to various structures such as a vehicle, a home electronic appliance, an architecture, etc.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
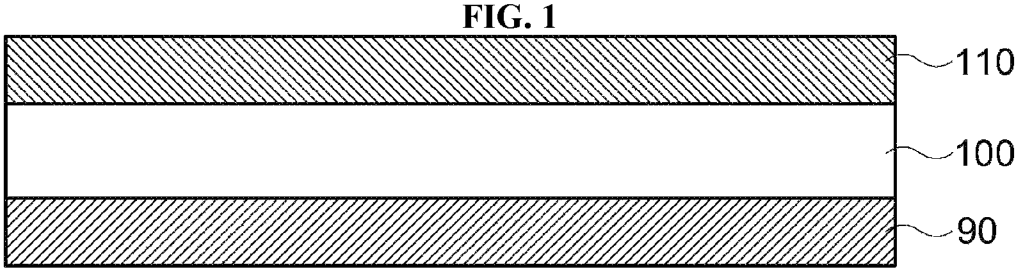
FIGS. 1 and 2 are a schematic cross-sectional view and a schematic top planar view, respectively, illustrating an antenna device in accordance with exemplary embodiments.
Figure 2:
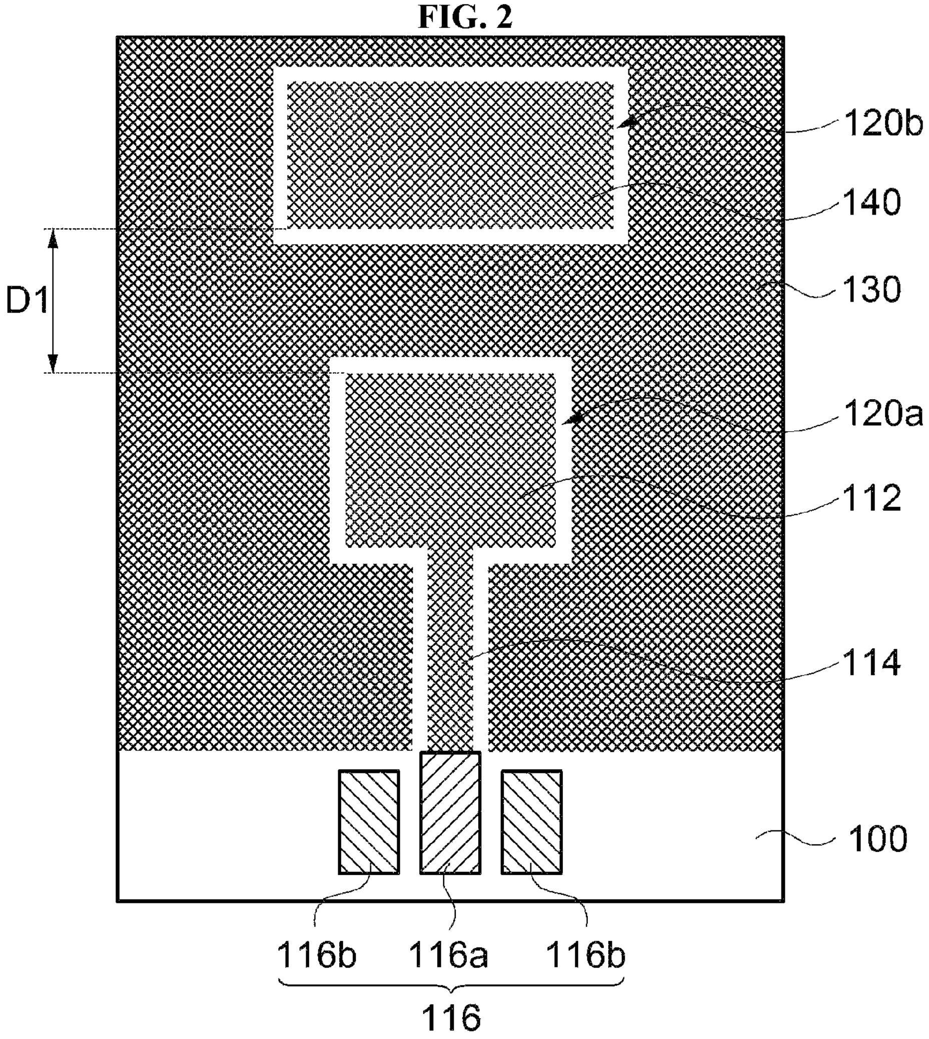

FIGS. 1 and 2 are a schematic cross-sectional view and a schematic top planar view, respectively, illustrating an antenna device in accordance with exemplary embodiments.

Referring to FIGS. 1 and 2, the antenna device according to exemplary embodiments may include a dielectric layer 100, a first electrode layer 110 disposed on a top surface of the dielectric layer 100, and a second electrode layer 90 disposed on a bottom surface of the dielectric layer 100.

The dielectric layer 100 may include an insulating material having a predetermined dielectric constant. The dielectric layer 100 may include, e.g., an inorganic insulating material such as glass, silicon oxide, silicon nitride, a metal oxide, etc., or an organic insulating material such as an epoxy resin, an acrylic resin, an imide-based resin, etc. The dielectric layer 100 may serve as a film substrate of the antenna device on which the first electrode layer 110 is formed.

For example, a transparent film may be used as the dielectric layer 100. The transparent film may include a polyester-based resin such as polyethylene terephthalate, polyethylene isophthalate, polyethylene naphthalate and polybutylene terephthalate; a cellulose-based resin such as diacetyl cellulose and triacetyl cellulose; a polycarbonate-based resin; an acrylic resin such as polymethyl (meth) acrylate and polyethyl (meth)acrylate; a styrene-based resin such as polystyrene and an acrylonitrile-styrene copolymer; a polyolefin-based resin such as polyethylene, polypropylene, a cycloolefin or polyolefin having a norbornene structure and an ethylene-propylene copolymer; a vinyl chloride-based resin; an amide-based resin such as nylon and an aromatic polyamide; an imide-based resin; a polyethersulfone-based resin; a sulfone-based resin; a polyether ether ketone-based resin; a polyphenylene sulfide resin; a vinyl alcohol-based resin; a vinylidene chloride-based resin; a vinyl butyral-based resin; an allylate-based resin; a polyoxymethylene-based resin; an epoxy-based resin; a urethane or acrylic urethane-based resin; a silicone-based resin, etc. These may be used alone or in a combination of two or more therefrom.

In some embodiments, an adhesive film such as an optically clear adhesive (OCA), an optically clear resin (OCR), or the like may be included in the dielectric layer 100.

In some embodiments, a dielectric constant of the dielectric layer 100 may be adjusted in a range from about 1.5 to about 12. When the dielectric constant exceeds about 12, a driving frequency may be excessively decreased and a driving in a desired high-frequency band may not be implemented. Preferably, the dielectric constant of the dielectric layer 100 may be adjusted in a range from about 2 to about 10.

As illustrated in FIG. 2, The first electrode layer 110 may include an antenna unit including a radiator 112 and a transmission line (feeding line) 114.

In some embodiments, the first electrode layer 110 may further include a dummy pattern 130 arranged around the antenna unit The first electrode layer 110 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), molybdenum (Mo), calcium (Ca) or an alloy containing at least one of the metals. These may be used alone or in a combination of at least two therefrom.

For example, the radiator 112 and the dummy pattern may include silver (Ag) or a silver alloy (e.g., a silver-palladium-copper (APC) alloy or a copper-calcium (CuCa) alloy).

to reduce a resistance, and may include, e.g.,

In some embodiments, the first electrode layer 110 may include a transparent conductive oxide such as indium tin oxide (ITO), indium zinc oxide (IZO), indium zinc tin oxide (ITZO), zinc oxide (ZnOx), or the like.

In some embodiments, the first electrode layer 110 may have a double-layered structure of a transparent conductive oxide layer-a metal layer, or a triple-layered structure of a transparent conductive oxide layer-a metal layer-a transparent conductive oxide layer. In this case, flexible property may be improved by the metal layer while reducing a resistance. Corrosive resistance and transparency may be improved by the transparent conductive oxide layer.

In one embodiment, as illustrated in FIG. 2, the radiator 112 and/or the transmission line 114 may have a mesh structure including the above-described conductive material to improve transparency or transmittance. In this case, the dummy pattern 130 may also include a mesh structure, and a visual recognition of the radiator 112 and/or the transmission line 114 may be further prevented.

In an embodiment, in the dummy pattern 130, electrode lines included in the mesh structure may include cut portions. Accordingly, transmittance of the dummy pattern 130 may be additionally increased, and radiation interference and signal interference to the radiator 112 may be reduced.

The transmission line 114 may extend from one end portion of the radiator 112. For example, the transmission line 114 may protrude and extend from a central portion of the radiator 112.

In an embodiment, the transmission line 114 may include substantially the same conductive material as that of the radiator 112 and may be formed through substantially the same etching process. In this case, the transmission line 114 may be integrally connected to the radiator 112 and may be provided as a substantially single member.

In an embodiment, a conductive layer including the above-described metal, alloy and/or transparent conductive oxide may be formed on the dielectric layer 100, and the conductive layer may be etched to form a mesh layer. While forming the mesh layer, a first separation region 120*a* may be formed by etching along profiles of the radiator 112 and the transmission line 114. The antenna unit including the radiator 112 and the transmission line 114 may be separated from the dummy pattern 130 in the mesh layer by the first separation region 120*a*.

In exemplary embodiments, the first electrode layer 110 may further include a reflective pattern 140. The reflective pattern 140 may be physically and electrically separated from the radiator 112 by a first spacing distance D1.

In some embodiments, the reflective pattern 140 may include a mesh structure. For example, a second separation region 120*b* may be formed by partially etching the conductive layer while forming the mesh layer. A pattern defined by the second separation region 120*b* in the mesh layer may be defined as the reflective pattern 140. For example, the reflective pattern 140 may have an island shape isolated in the dummy pattern 130.

The reflective pattern 140 may be separated from the radiator 112 with the dummy pattern 130 interposed therebetween. In some embodiments, the first spacing distance D1 may be equal to or greater than half a wavelength (212) of a wavelength corresponding to a resonance frequency of the radiator 112. In the above range, signal interference to the radiator 112 may be sufficiently suppressed. Preferably, the first spacing distance D1 may be equal to or greater than one wavelength 2.

The first spacing distance D1 may be defined as the shortest distance between the radiator 112 and the reflective pattern 140 neighboring each other.

The reflective pattern 140 may reflect, e.g., a frequency or a signal transmitted from another antenna device or another communication device. Accordingly, the communication devices on which the antenna device is included according to exemplary embodiments may mutually transmit or receive a frequency or a signal.

When the driving frequency of the radiator 112 is shifted to a high frequency or ultra-high frequency band of 20 GHz or more, or 30 GHz or more, a diffraction property may become weak, and a gain and a coverage through one antenna device may be lowered.

However, when the above-described antenna devices including the reflective pattern 140 are operated together, a concentration degree of radiation in the radiator 112 may be increased as the mutual signal transmission/reception is implemented, and the gain and directivity through the antenna device may also be promoted.

A pad electrode 116 may be disposed at one end portion of the transmission line 114. In some embodiments, the pad electrode 116 may include a signal pad 116*a* and a ground pad 116*b*. The signal pad 116*a* may be electrically connected to the radiator 112 through the transmission line 114, and may electrically connect a driving circuit unit (e.g., an IC chip) to the radiator 112.

For example, a circuit board such as a flexible circuit board (FPCB) may be bonded to the signal pad 116*a*, and the driving circuit unit may be disposed on the flexible circuit board. Accordingly, signal transmission/reception may be implemented between the antenna unit and the driving circuit unit.

In an embodiment, the driving circuit unit may be directly mounted on the flexible circuit board. In an embodiment, an intermediate circuit board such as a rigid printed circuit board (Rigid-PCB) may be further disposed between the driving circuit unit and the flexible circuit board.

In some embodiments, a pair of the ground pads 116*b* may be disposed to face each other while being electrically and physically spaced apart from the signal pad 116*a* with the signal pad 116*a* interposed therebetween. Accordingly, a bonding process of the flexible circuit board may be easily implemented, and a horizontal radiation and a vertical radiation may be implemented from the antenna device.

The pad electrode 116 may have a solid structure including the above-described metal or alloy to reduce a signal resistance. The pad electrode 116 may be located at the same layer as that of the antenna unit (e.g., on the top surface of the dielectric layer 100).

Alternatively, the pad electrode 116 may be located at a layer different from that of the antenna unit. For example, an insulating layer covering the antenna unit may be formed, and the pad electrode 116 may be formed on the insulating layer. In this case, the signal pad 116*a* may be electrically connected to the transmission line 114 through a contact penetrating the insulating layer.

The second electrode layer 90 may serve as a ground electrode of the antenna unit. For example, a capacitance or an inductance is formed in a thickness direction of the antenna device between the radiator 112 and the second electrode layer 90 by the dielectric layer 100, so that a frequency band at which the antenna device may be operated or driven may be adjusted. For example, the antenna device may serve as a vertical radiation antenna by the second electrode layer 90.

The second electrode layer 90 may include a metal substantially the same as or similar to that used in the first electrode layer 110. In an embodiment, a conductive member of the display device to which the antenna device is employed may serve as the second electrode layer 90.

The conductive member may include, e.g., a gate electrode of a thin film transistor (TFT), various wiring such as a scan line and a data line, or various electrodes such as a pixel electrode and a common electrode included in a display panel.

In an embodiment, for example, various structures including a conductive material disposed under the display panel may serve as the second electrode layer 90. For example, a metal plate (e.g., a stainless-steel plate such as a SUS plate), a pressure sensor, a fingerprint sensor, an electromagnetic wave shielding layer, a heat dissipation sheet, a digitizer, etc., may serve as the ground layer.

As described above, the transmittance of the antenna device may be improved by forming the antenna unit to include the mesh structure. Additionally, the reflective pattern 140 and the dummy pattern 130 having the mesh structure may be arranged around the antenna unit. Accordingly, the antenna unit may be prevented from being recognized to a user of the display device due to a local difference in electrode arrangements while improving a radiation efficiency by the reflective pattern 140.

Further, the antenna unit and the reflective pattern 140 may be disposed at the same layer or at the same level to reduce a space for accommodating the antenna device. Thus, the antenna device providing improved radiation efficiency in a limited space may be achieved.

In some embodiments, each of the antenna unit and the reflective pattern 140 may have a solid structure including the above-described conductive material. In this case, the dummy pattern 130 may be omitted.

If the antenna device is disposed at a rear portion of the display device which may not be visible to the user, the solid structure may be employed instead of the mesh structure to reduce a resistance of the radiator 112 and increase a reflectance by the reflective pattern 140.

FIGS. 3 to 6 are schematic top planar views illustrating antenna devices in accordance with some exemplary embodiments.

Figure 3:
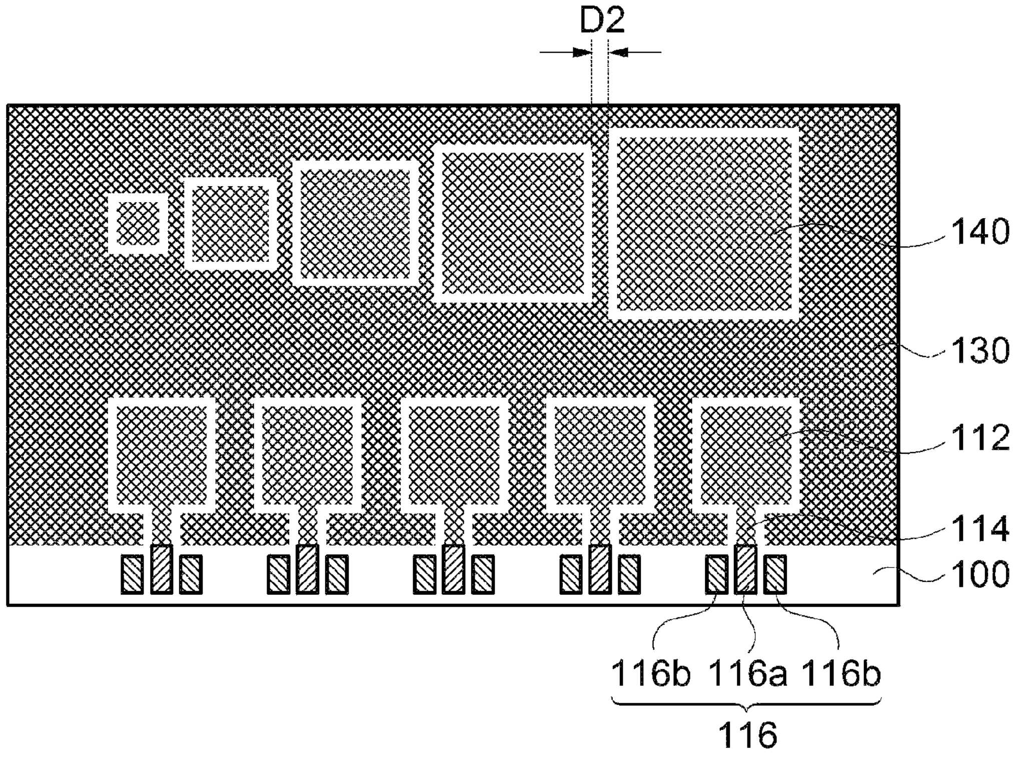
FIGS. 3 to 6 are schematic top planar views illustrating antenna devices in accordance with some exemplary embodiments.

Referring to FIG. 3, a plurality of the antenna units and a plurality of the reflective patterns 140 may be arranged to form arrays.

For example, the antenna units each including the radiator 112, the transmission line 114 and the pad electrode 116 may be arranged in a horizontal direction. The plurality of the reflective patterns 140 may also be arranged along an arrangement direction of the antenna units.

In exemplary embodiments, the plurality of the reflective patterns 140 may be arranged so that areas may sequentially increase (sequentially decrease) along the horizontal direction. Further, the neighboring reflective patterns 140 may be separated by a second spacing distance D2.

For example, a reflected frequency band may be adjusted by the area of the reflective pattern 140, and a phase difference between the reflective patterns 140 may be canceled by adjusting the second spacing distance D2.

The areas of the reflective patterns 140 may be sequentially increased, so that a coverage of the reflected frequency may be increased, and collision or interference between the reflective patterns 140 may be prevented by adjusting the second spacing distance D2.

The second spacing distance D2 may be the shortest distance between the neighboring reflective patterns 140. The second spacing distance D2 may be smaller than the first spacing distance D1 described with reference to FIG. 2.

In some embodiments, the areas and the distances of the reflective patterns 140 may be adjusted so that a phase difference between frequencies reflected by the reflective patterns 140 may be substantially 0 (zero). In this case, reflection angles reflected by the antenna device may be adjusted to be the same, so that an intensity and a directivity of the reflected frequency through the reflective pattern 140 may be enhanced.

Figure 4:
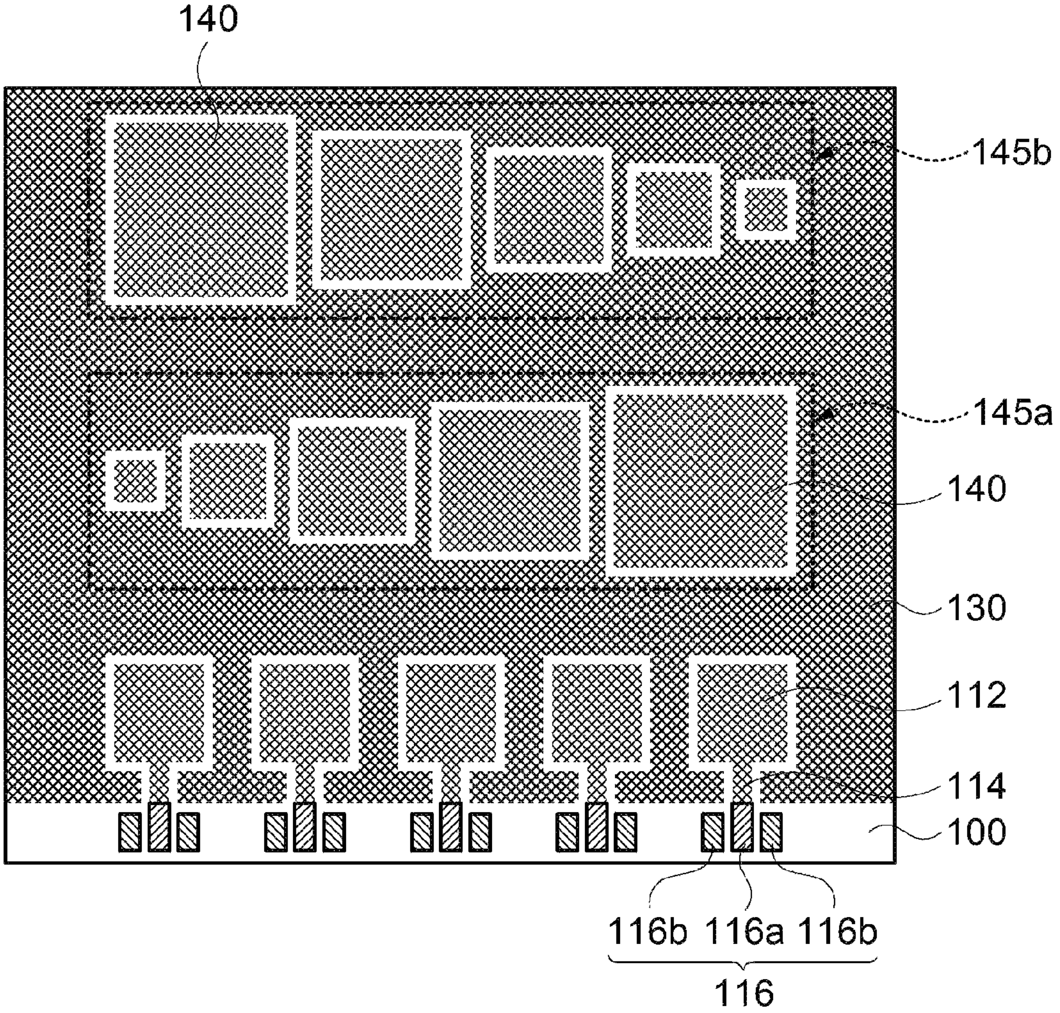

Referring to FIG. 4, a plurality of reflective pattern rows may be formed in an array form. For example, a first reflective pattern row 145*a* and a second reflective pattern row 145*b* each including a plurality of the reflective patterns 140 arranged in a horizontal direction may be adjacent to each other in a vertical direction.

In this specification, the horizontal direction and the vertical direction may refer to two directions parallel to the top surface of the dielectric layer 100 and perpendicular to each other.

In some embodiments, the arrangements of the first reflective pattern row 145*a* and the second reflective pattern row 145*b* may be opposite to each other. For example, the reflective patterns 140 included in the first reflective pattern row 145*a* may be arranged so that areas may sequentially increase along the horizontal direction. The reflective patterns included in the second reflective pattern row 145*b* may be arranged so that areas may sequentially decrease along the horizontal direction.

The adjacent reflective pattern rows may be oriented in an inverse arrangement, so that a reflective frequency coverage from the antenna device may be averaged and increased.

Figure 5:
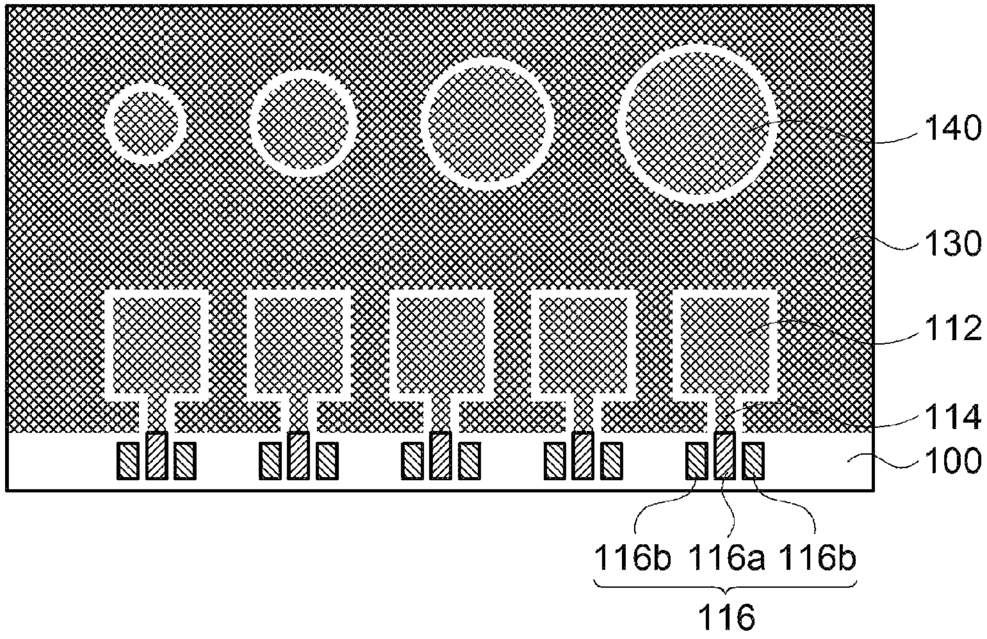

Referring to FIG. 5, a shape of the reflective pattern 140 may be properly modified. As illustrated in FIGS. 2 to 4, the reflective pattern 140 may have a polygonal pattern shape such as a quadrangle shape. In an embodiment, as illustrated in FIG. 5, the reflective pattern 140 may have a circular pattern shape.

Figure 6:
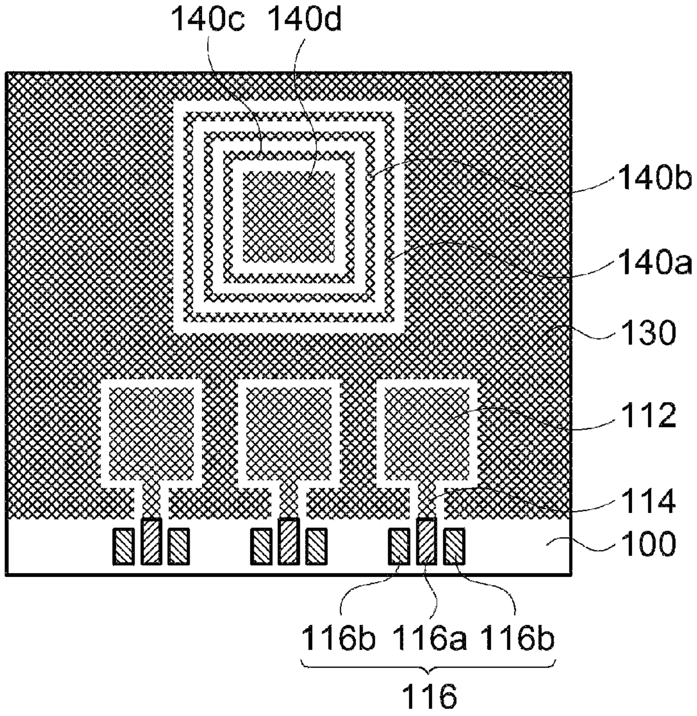

Referring to FIG. 6, the reflective patterns 140 may be arranged in a form in which patterns having different areas overlap each other in a planar view.

For example, a second reflective pattern 140*b* having a reduced area may be included in a first reflective pattern 140*a*, and a third reflective pattern 140*c* having a reduced area may be included in the second reflective pattern 140*b*, and a fourth reflective pattern 140*d* having a reduced area may be included in the third reflective pattern 140*c*. A plurality of the reflective patterns 140 may be arranged as areas sequentially decrease in the above-described manner.

The reflected patterns 140 may sequentially overlap each other in one plane, so that a reflection concentration may be enhanced while also increasing a coverage of reflected frequencies.

Figure 7:
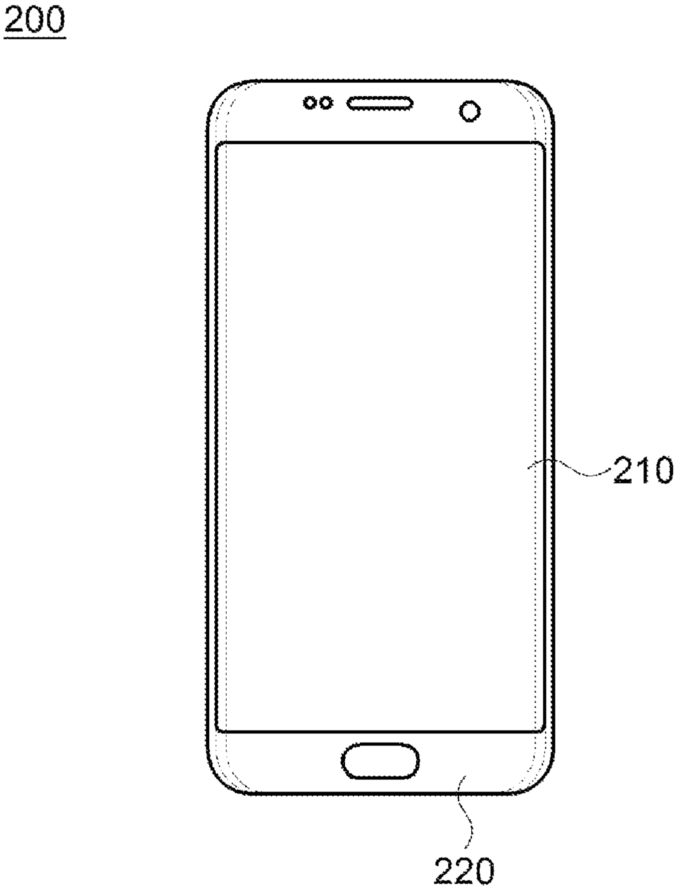
FIG. 7 is a schematic top planar view illustrating a display device in accordance with exemplary embodiments.

FIG. 7 is a schematic top planar view illustrating a display device in accordance with exemplary embodiments. For example, FIG. 7 illustrates an outer shape including a window of a display device.

Referring to FIG. 7, a display device 200 may include a display area 210 and a peripheral area 220. The peripheral area 220 may be positioned at both lateral sides and/or both ends of the display area 210.

In some embodiments, the above-described antenna device may be inserted into the peripheral area 220 of the display device 200 in the form of a patch or a film. In some embodiments, the radiator 112 of the above-described film antenna may be disposed to at least partially correspond to the display area 210 of the display device 200, and the pad electrode 116 may be disposed to correspond to the peripheral area 220 of the display device 200.

The peripheral area 220 may correspond to, e.g., a light-shielding portion or a bezel portion of the image display device. Further, a driving circuit such as an IC chip of the display device 200 and/or the antenna device may be disposed in the peripheral area 220.

The pad electrode 116 of the antenna device may be disposed to be adjacent to the driving circuit, so that a signal transmission/reception path may be shortened and a signal loss may be suppressed.

In some embodiments, the dummy pattern 130 of the antenna device may be disposed in the display area 210. The reflective pattern 140 of the antenna device may also be disposed in the display area 210. For example, the pad electrode 116 and the reflective pattern 140 of the antenna device may be disposed at opposite sides with the radiator 112 interposed therebetween.

A visual recognition of the radiator 112 may be prevented by the dummy pattern 130, and a mutual transmission/reception of frequency or signal between different display devices may be implemented by the reflective pattern 140.

Thus, an overall radiation efficiency and radiation reliability of the display devices 200 including the antenna device according to the exemplary embodiments may be improved.

As described above, the antenna device may be disposed at a rear portion of the display device 200. In this case, the radiator 112 and the reflective pattern 140 may each have a solid conductive pattern shape.

What is claimed is:

1. An antenna device, comprising:

a dielectric layer;

an antenna unit disposed on a top surface of the dielectric layer, the antenna unit comprising a radiator and a transmission line connected to the radiator; and a reflective pattern electrically and physically separated from the antenna unit and disposed on the top surface of the dielectric layer together with the antenna unit to reflect a frequency or a signal transmitted from another antenna device or another communication device, wherein a spacing distance between the radiation pattern and the reflective pattern is equal to or greater than half a wavelength (λ/2) of a resonance frequency of the radiation pattern.

2. The antenna device of claim 1, wherein the antenna unit and the reflective pattern each includes a mesh structure.

3. The antenna device of claim 2, further comprising a dummy pattern having a mesh shape, wherein the dummy pattern is disposed around the antenna unit and the reflective pattern to be electrically and physically separated from the antenna unit and the reflective pattern.

4. The antenna device of claim 1, wherein a plurality of the reflective patterns are arranged in a horizontal direction.

5. The antenna device of claim 4, wherein the plurality of the reflective patterns are arranged so that areas of the reflective patterns sequentially increase or decrease along the horizontal direction.

6. The antenna device of claim 4, wherein a plurality of the reflective patterns are arranged in the horizontal direction to define a reflective pattern row, and a plurality of the reflective pattern rows are arranged along a vertical direction.

7. The antenna device of claim 6, wherein the reflective patterns included in the reflective pattern rows neighboring each other are arranged to face each other in an opposite arrangement form or in an opposite arrangement order.

8. The antenna device of claim 1, wherein the reflective patterns having different areas are disposed to sequentially overlap in a planar view.

9. The antenna device of claim 1, wherein the antenna unit further comprises a signal pad connected to an end portion of the transmission line.

10. The antenna device of claim 9, wherein the reflective pattern and the signal pad are disposed at opposite sides with the radiator interposed therebetween.

11. The antenna device of claim 1, further comprising a ground layer disposed on a bottom surface of the dielectric layer.

12. The antenna device of claim 1, wherein the radiator and the reflective pattern comprise at least one selected from the group consisting of silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), molybdenum (Mo), calcium (Ca) and an alloy containing at least one therefrom.

13. A display device comprising the antenna device according to claim 1.

14. The display device of claim 13, wherein the antenna device is disposed at a front side of the display device, and the radiator and the reflective pattern have a mesh structure.

15. The display device of claim 13, wherein the antenna device is disposed at a rear side of the display device, and the radiator and the reflective pattern have a shape of a solid conductive pattern separated from each other.

* * * * *